US006892079B1

(12) United States Patent
Rautiainen

(10) Patent No.: US 6,892,079 B1
(45) Date of Patent: May 10, 2005

(54) PROCEDURE FOR SETTING UP A CALL IN A WIRELESS LOCAL LOOP

(75) Inventor: Jaakko Rautiainen, Oulu (FI)

(73) Assignee: Nokia Networks Oy (FI)

( * ) Notice: Subject to any disclaimer, the term of this patent is extended or adjusted under 35 U.S.C. 154(b) by 0 days.

(21) Appl. No.: 09/516,973

(22) Filed: Feb. 29, 2000

Related U.S. Application Data

(63) Continuation of application No. PCT/FI98/00654, filed on Sep. 1, 1997.

(30) Foreign Application Priority Data

Sep. 1, 1997 (FI) .................................................. 973579

(51) Int. Cl.[7] .............................. H04B 1/38; H04M 1/66; H04M 1/00; H04Q 7/20
(52) U.S. Cl. ........................ 455/561; 455/410; 455/415; 455/425; 455/515; 455/426.2; 455/554.2
(58) Field of Search ......................... 455/560, 410–411, 455/415, 426.2, 554.2, 425, 515, 550.1, 3.01, 3.05, 554, 561, 511; 379/32.01

(56) References Cited

U.S. PATENT DOCUMENTS

| | | | | |
|---|---|---|---|---|
| 4,811,382 A | * | 3/1989 | Sleevi ........................ | 379/67.1 |
| 5,428,670 A | * | 6/1995 | Gregorek et al. .......... | 379/67.1 |
| 5,845,211 A | * | 12/1998 | Roach, Jr. .................. | 455/436 |
| 6,002,919 A | * | 12/1999 | Posti .......................... | 455/67.1 |
| 6,035,178 A | * | 3/2000 | Chennakeshu et al. .... | 455/12.1 |
| 6,097,966 A | * | 8/2000 | Hanley ....................... | 455/555 |
| 6,275,943 B1 | * | 8/2001 | Pentikainen et al. ....... | 713/201 |
| 6,314,292 B1 | * | 11/2001 | Ho et al. ..................... | 455/450 |
| 6,574,730 B1 | * | 6/2003 | Bissell et al. ............... | 713/168 |

FOREIGN PATENT DOCUMENTS

| | | |
|---|---|---|
| EP | 0 769 883 | 4/1997 |
| WO | 95/24103 | 9/1995 |
| WO | 96/32824 | 10/1996 |
| WO | 97/20445 | 6/1997 |
| WO | 99/12376 | 3/1999 |

OTHER PUBLICATIONS

ETS 300 324–1, "Signalling Protocols and Switching (SPS); V interfaces at the digital Local Exchange (LE) V5.1 interface for the support of Access Network (AN) Part 1: V5.1 interface specification", *European Telecommunications Standards Institute*, pp. 1–274 (Feb. 1994).

ETS 300 347–1, "Signalling Protocols and Switching (SPS); V interfaces at the digital Local Exchange (LE) V5.2 interface for the support of Access Network (AN) Part 1: V5.2 interface specification", *European Telecommunications Standards Institute*, pp. 1–271 (Sep. 1994).

ETS 300 557, "Digital cellular telecommunications system (Phase 2); Mobile radio interface; Layer 3 specification (GSM 04.08 version 4.23.1)", *European Telecommunications Standards Institute*, 471 pgs. (Oct. 1999).

"Cryptographic Security Techniques for Digital Mobile Telephones" Cooke, et al. IEEE 0–7803–0723–2/92, Feb. 1992.

* cited by examiner

Primary Examiner—William Trost
Assistant Examiner—Meless Zewdu
(74) Attorney, Agent, or Firm—Squire, Sanders & Dempsey

(57) ABSTRACT

A procedure for setting up a call in a wireless local loop based on mobile communication technology in which terminal units are connected via a radio link to an access node and from the access node to a wired network local exchange via a standard V5 interface in which checking functions consistent with a mobile communication specification are carried out is disclosed herein. To accelerate call setup, checking functions are carried out during voice mode connection of the call.

8 Claims, 1 Drawing Sheet

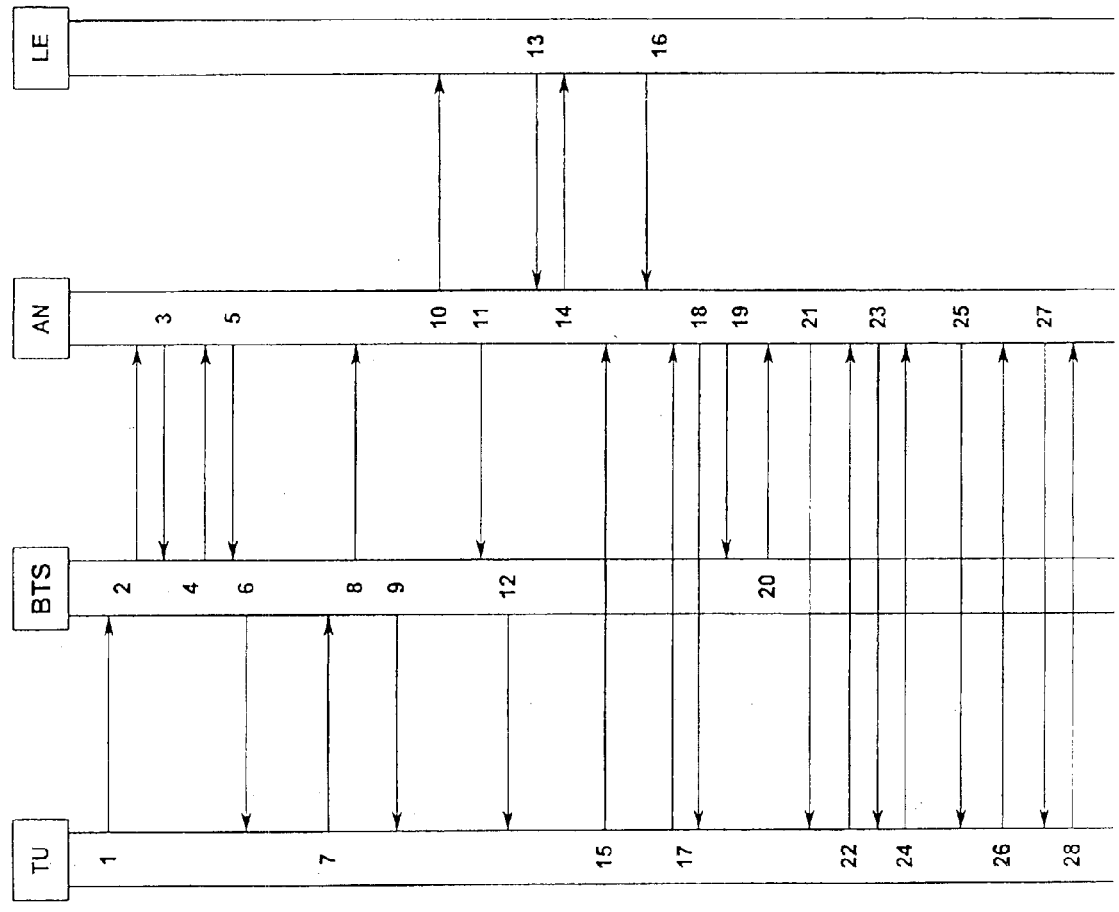

Figure 1

1. CHANNEL_REQUEST
2. CHANNEL_REQUIRED
3. CHANNEL_ACTIVATION
4. CHANNEL_ACTIVATION_ACK
5. IMMEDIATE_ASSIGNMENT_COMMAND
6. IMMEDIATE_ASSIGN

7. SABM (CM_SERV_REC)
8. ESTABLISH_INDICATION
9. UA

10. ESTABLISH (SS=OFFHOOK)
11. ENCRYPTION_COMMAND
12. CIPHERING_MODE_COMMAND
13. ALLOCATION
14. ALLOCATION_COMPLETE
15. CIPHERING_MODE_COMPLETE
16. ESTABLISH_ACK
17. SETUP

18. CALL_PROCEEDING
19. MODE_MODIFY
20. MODE_MODIFY_ACK
21. CHANNEL_MODE_MODIFY
22. CHANNEL_MODE_MODIFY_ACK
23. CONNECT
24. CONNECT_ACK

25. IDENTIFICATION_REQUEST
26. IDENTIFICATION_RESPONSE
27. AUTHENTICATION_REQUEST
28. AUTHENTICATION_RESPONSE

PROCEDURE FOR SETTING UP A CALL IN A WIRELESS LOCAL LOOP

This application is a continuation of PCT/FI98/00654 filed Sep. 1, 1997.

BACKGROUND OF THE INVENTION

The present invention relates to a procedure for accelerating call setup in a wireless local loop.

In a wireless local loop (WLL, Wireless Local Loop or RLL, Radio in Local Loop), a terminal unit is connected via a wireless link to an access node (AN). The access node may consist of multiplexers, crossbar switches and various transmitting systems. The WLL system may be based, e.g., on technology used in mobile telephone systems, such as the GSM/DCS1800 technology (GSM, Global System for Mobile Communications; DCS, Digital Cellular System). GSM is a European digital mobile communication system standardised by ETSI. DCS-1800 is a mobile communication system standardised by ETSI, which is based on the GSM specification and aims at a more effective use of microcells and which works in the frequency range of 1800 MHz. Between the terminal unit and the access node there is a base transceiver station, through which call signals received from the terminal unit over a radio channel are transmitted via the access node to a public telephone network and vice versa. The access node can be connected to the telephone exchange using, e.g., a V5.2 protocol consistent with the ETS 300 347-1 standard or a V5.1 protocol consistent with the ETS 300 324-1 standard. The access node functions as a converter between GSM signalling and V5 signalling.

During call setup in a local loop, various checking functions related to network security management are carried out. The checking functions are designed to prevent illicit access to the network for users who have no right to use it, and to prevent the use of e.g. a mobile station reported stolen. The checking operations defined by the GSM specifications, carried out during call setup, retard the call setup process so that the V5 signalling time-outs are tripped and the call must be disconnected even though it is most likely to be successful. In a wireless local loop, fast setup of an outgoing call is particularly important.

An operation retarding call setup is, e.g., change of the subscriber identity code (TMSI reallocation), which means changing the temporary subscriber identity code assigned for the subscriber by the visitor location register and allowing confidential subscriber identification, e.g., during the call. Another check retarding call setup is the verification of the subscriber's access right, i.e., subscriber authentication, which means checking the subscriber data of a mobile station and preventing illicit access to the network. A third check retarding call setup is the verification of the subscriber's equipment identity code (IMEI check). To check the equipment identity code, it is compared with a register of equipment identity codes of mobile stations reported stolen and/or defective. IMEI is an international mobile station equipment identity code, by means of which a mobile station can be unambiguously identified.

Especially the time-outs in the PSTN protocol in the V5 interface (standard ETS 300 324-1 1 13) cause problems in call setup in a wireless local loop system. For instance, in the case of a terminating call, the time-out according to the V5 PSTN protocol between the start message and the acknowledgement message (the telephone rings) is max. 4 seconds (standard ETS 300 324-1 13.6).

SUMMARY OF THE INVENTION

The object of the present invention is to eliminate the drawbacks described above.

A specific object of the invention is to present a procedure that can be used to accelerate call setup so that unnecessary tripping of time-outs and needless disconnection of calls are avoided and the time available for the signalling needed for the call setup itself is increased.

According to the invention, to accelerate call setup, checking functions are performed during voice mode connection of the call instead of being performed during call setup. The invention provides the advantage that more time is made available for the signalling needed for call setup while possible tripping of time-outs and unnecessary disconnection of the call are avoided.

In an embodiment of the procedure, subscriber's terminal units are connected to an access node via a radio link consistent with the GSM specification and checking functions are carried out, said functions comprising change of the subscriber identity code (TMSI reallocation), verification of subscriber authenticity (authentication) and/or verification of the subscriber's equipment identity code (IMEI check).

In an embodiment of the procedure, the change of the subscriber identity code is TMSI reallocation consistent with the GSM 04.08 4.3.1. standard.

In an embodiment of the procedure, the verification of subscriber authenticity is an authentication consistent with the GSM 04.08. 4.3.2 standard.

In an embodiment of the procedure, the verification of the subscriber's equipment identity code is an IMEI check consistent with the GSM 04.08. 4.3.3 standard.

In an embodiment of the procedure, the V5 interface is a V5.2 interface consistent with the ETS 300 347-1 standard.

In an embodiment of the procedure, the V5 interface is a V5.1 interface consistent with the ETS 300 324-1 standard.

BRIEF DESCRIPTION OF THE DRAWING

Referring now to the drawing:

FIG. 1 is a signalling diagram for call setup and voice mode connection according to an embodiment of the present invention.

DETAILED DESCRIPTION OF THE INVENTION

FIG. 1 presents a signalling diagram representing a call originated by a terminal unit TU in a wireless local loop and substantially corresponding to a mobile-originated call MOC consistent with the GSM specifications. The system components in the diagram are a base transceiver station BTS, an access node AN, i.e., a node of an access network, and a local exchange LE.

The access node AN has three program segments called registers. These are an equipment identity register, an authentication register and, hierarchically above these, a visitor location register. The equipment identity register contains the international mobile station equipment identity numbers (IMEI). An equipment identity number may be placed on a white, grey or black list, and in response to an IMEI check the equipment identity register returns the list colour of the IMEI concerned. The authentication register produces the triplets needed in authentication and contains the data required for authentication. The functions of the visitor location register include making the decision about carrying out the checks.

In the GSM/DCS world, the following register terms are used: authentication centre AUC or AC, equipment identity register EIR and visitor location register VLR. In conjunction with a wireless local loop, the visitor location register is designated WFR (wireless fixed register).

Call setup in a wireless local loop in the so-called non-transparent mode as presented in the FIGURE is substantially identical with call setup in a conventional GSM system. In a wireless local loop system, the access node AN also comprises functions that are included in the mobile switching centre/visitor location register MSC/VLR and home location register/authentication centre/equipment identity register (HLR/AC/EIR) of an ordinary GSM system. In a wireless local loop, the subscriber terminal units communicate with the access node AN by radio. The signalling between the terminal unit and the access node AN is message based signalling consistent with the GSM specifications (GSM/DCS). The access node AN is connected to a wired network local exchange LE via a V5.2 interface consistent with the ETS 300 347-1 standard.

When the subscriber picks up the receiver, the terminal unit generates a local dial tone. The subscriber has a predetermined period of time to dial the first digit. The dial tone goes out as soon as the first digit has been dialled. The item numbers below correspond to the numbering in the FIGURE.

1. Call setup is started upon the lapse of a predetermined period of time after the last digit has been dialled. The terminal unit TU requests a call by sending a CHANNEL_REQUEST message to the base transceiver station BTS.

2. The base transceiver station BTS transmits a CHANNEL_REQUIRED message to the access node AN, which starts a search to find a communication channel.

3. After a communication channel has been successfully allocated, the access node AN activates the channel by sending a CHANNEL_ACTIVATION message to the base transceiver station BTS.

4. The base transceiver station acknowledges activation by returning a CHANNEL_ACTIVATION_ACK message. The base transceiver station BTS starts transmission and reception on this channel using the power and timing data received in this message.

5. After the communication channel has been successfully activated, the access node AN sends an IMMEDIATE_ASSIGNMENT_COMMAND message to the base transceiver station BTS.

6. This message contains an IMMEDIATE_ASSIGNMENT message, which the base transceiver station BTS sends to the terminal unit TU.

7. Having received the IMMEDIATE_ASSIGNMENT message, the terminal unit TU is tuned to the specified communication channel and starts setting up a signalling link over the network. The terminal unit TU sends a layer-2 SABM (CM_SERV_REC) message to the base transceiver station BTS via the communication channel. The SABM contains a layer-3 service request message.

8. The base transceiver station sends the service request of the terminal unit further to the access node AN in an ESTABLISH_INDICATION message, which includes the subscriber's temporary mobile subscriber identity (TMSI) code.

9. The base transceiver station BTS acknowledges the SABM message by sending a UA frame to the terminal unit TU.

10. The access node finds the subscriber's L3 address (using the TMSI and IMSI) and checks the state of the corresponding V5 interface. If call setup is allowed, the access node AN sends an ESTABLISH (SS=OFFHOOK) message to the local exchange LE.

11. At the same time, the access node AN starts encryption by sending an ENCRYPTION_COMMAND message to the base transceiver station BTS. The base transceiver station BTS analyses the command. If encryption is needed, the base transceiver station BTS activates a demodulator for the deciphering of the encryption.

12. If encryption is used, the base transceiver station BTS sends a CIPHERING_MODE_COMMAND message to the terminal unit TU.

13.–14. The local exchange LE sends to the access node AN an ALLOCATION message, which contains the time slot used in the V5.2 interface. The access node AN acknowledges this by sending an ALLOCATION_COMPLETE message to the local exchange LE.

15. After receiving the CIPHERING_MODE_COMMAND message, the terminal unit TU starts encryption deciphering and ciphering using an available ciphering key and returns to the base transceiver station BTS, in ciphered form, a CIPHERING_MODE_COMPLETE message or the next message it is to send. Upon receiving the CIPHERING_MODE_COMPLETE message (or any layer-2 frame correctly ciphered), the base transceiver station BTS starts encryption and transfers the message transparently to the access node AN.

16. When the local exchange LE is ready to receive a dialled number, it sends an ESTABLISH_ACK message to the access node AN. A connection between the access node AN and the local exchange LE is set up and the speech path is connected through.

17. The terminal unit TU starts call setup by a SETUP message, which contains e.g. the number of the called subscriber and the call type (voice/data). The access node AN checks in the VLR/HLR database whether call setup is allowed for the subscriber. If the right conditions are fulfilled, then the access node AN sends the DTMFS (dual tone multi-frequency signal) numbers (together with the V5 messages) to the local exchange LE.

18. Having sent the numbers, the access node sends a CALL_PROCEEDING message to the terminal unit TU, indicating that the call is under processing.

19.–22. The channel mode is changed from signalling to voice via a "mode modify" procedure. First, the access node AN sends a MODE_MODIFY message to the base transceiver station BTS to change the channel mode. Synchronisation by a transcoder begins. After receiving a MODE_MODIFY_ACK message, the access node starts the channel mode change process and sends a CHANNEL_MODE_MODIFY message to the terminal unit TU. This command is transparent to the base transceiver station BTS. Having received the CHANNEL_MODE_MODIFY message, the terminal unit TU changes the channel mode from signalling to voice and sends an acknowledgement to the access node AN with a CHANNEL_MODE_MODIFY_ACK message. This message, too, is transparent to the base transceiver station BTS.

23.–24. The terminal unit TU is set to voice mode by sending a CONNECT message to it. The terminal unit TU acknowledges this by sending a CONNECT_ACK message. The subscriber now hears the ring-back tone from the local exchange LE.

25.–26. If the visitor location register VLR of the access node does not recognise the temporary TMSI code, then the international mobile subscriber identity IMSI is requested by an IDENTIFICATION_REQUEST message. In response, an IDENTIFICATION_RESPONSE message is sent to the terminal unit TU.

27. The access node AN starts authentication by sending an AUTHENTICATION_REQUEST message to the terminal unit TU.

28. The terminal unit TU sends a calculated response in an AUTHENTICATION_RESPONSE message to the access node AN.

The invention is not restricted to the examples of its embodiments described above, but many variations are possible within the scope of the inventive idea defined by the claims.

What is claimed is:

1. A procedure for setting up a call in a wireless local loop based on mobile communication technology and in which subscriber terminal units are connected via a radio link to an access node and from the access node to a wired network local exchange and in which checking functions related to network security management are carried out, wherein, to accelerate call setup, said checking functions are carried out at a beginning of voice mode after ring-back tone has been received from the local exchange.

2. The procedure as defined in claim 1, wherein said checking functions comprise:

changing a subscriber identity code;

verification of authenticity of a subscriber; and verification of a subscriber's equipment identity code.

3. The procedure as defined in claim 2, wherein changing the subscriber identity code is via an allocation of a temporary subscriber identity code.

4. The procedure as defined in claim 2, wherein verification of subscriber authenticity is via an authentication request.

5. The procedure as defined in claim 2, wherein verification of subscriber's equipment identity code is via a check of a subscriber's international mobile station equipment identity code.

6. The procedure as defined in claim 1, wherein said checking functions comprise:

changing subscriber identity code; and verification of a subscriber's equipment identity code.

7. The procedure as defined in claim 6, wherein changing the subscriber identity code is via an allocation of a temporary subscriber identity code.

8. The procedure as defined in claim 6, wherein verification of the subscriber's equipment identity code is via a check of a subscriber's international mobile station equipment identity code.

* * * * *